United States Patent
Yamane et al.

(10) Patent No.: US 8,468,554 B2
(45) Date of Patent: Jun. 18, 2013

(54) SPINDLE MOTOR AND DISK DRIVE APPARATUS

(75) Inventors: Takuya Yamane, Kyoto (JP); Haruhiko Ito, Kyoto (JP); Takahiro Kikuichi, Kyoto (JP); Akira Sakauchi, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 13/407,213

(22) Filed: Feb. 28, 2012

(65) Prior Publication Data
US 2012/0254905 A1 Oct. 4, 2012

(30) Foreign Application Priority Data
Mar. 31, 2011 (JP) ................................ 2011-077920

(51) Int. Cl.
*G11B 19/20* (2006.01)
(52) U.S. Cl.
USPC .......................................................... 720/695
(58) Field of Classification Search
USPC .......................................................... 720/695
See application file for complete search history.

(56) References Cited

U.S. PATENT DOCUMENTS

| 8,074,238 | B2 * | 12/2011 | Woo | 720/702 |
| 2004/0232781 | A1 | 11/2004 | Yoo | |
| 2007/0294712 | A1 | 12/2007 | Ito et al. | |
| 2009/0150915 | A1 * | 6/2009 | Woo | 720/702 |
| 2009/0183191 | A1 * | 7/2009 | Park | 720/695 |
| 2011/0023056 | A1 * | 1/2011 | Yoo | 720/695 |

FOREIGN PATENT DOCUMENTS

| CN | 101093947 A | 12/2007 |
| CN | 101819795 A | 9/2010 |
| CN | 101820199 A | 9/2010 |
| JP | 2008-5584 A | 1/2008 |
| KR | 2003-0048800 A | 6/2003 |
| WO | 03/050413 A2 | 6/2003 |

* cited by examiner

*Primary Examiner* — Mark Blouin
(74) *Attorney, Agent, or Firm* — Westerman, Hattori, Daniels & Adrian, LLP

(57) ABSTRACT

A spindle motor includes a shaft, a cone, a turntable provide with a disk support portion, a cylindrical closed-top rotor holder, a rotor magnet, a stator, and a bearing mechanism. The cone includes a disk holding surface inclined radially outward and downward. The turntable further includes a resin-made table body having a disk support portion and an annular groove portion depressed upward at a lower side of the disk support portion, a plurality of balls rotatably arranged within the annular groove portion, an annular closure portion arranged between the table body and the rotor holder to close a lower opening of the annular groove portion, and a disc-shaped portion arranged radially inward of the annular groove portion of the table body, the disc-shaped portion having an upper surface bonded to the table body by an adhesive agent and a lower surface bonded to the rotor holder by the adhesive agent.

14 Claims, 7 Drawing Sheets

SPINDLE MOTOR AND DISK DRIVE APPARATUS

BACKGROUND OF THE INVENTION

1. Field of the Invention

The present invention relates to a spindle motor provided with a chucking device for removably holding a disk and a disk drive apparatus provided with the spindle motor.

2. Description of the Related Art

In recent years, the rotating speed of a disk and a spindle motor for rotating the disk grows faster in keeping with the increase in the speed at which information is recorded on and reproduced from a disk such as a CD or a DVD. As a chucking device coping with the high-speed rotation of the disk, there is available a structure that includes a cone having an annular slant surface making contact with the entire perimeter of the inner circumferential surface of the central opening of the disk. The cone is movable along the axial direction of a rotating shaft. The cone is biased axially upward by a resilient member such as a coil spring or the like.

A turntable for supporting the disk is arranged around the cone. A rotor holder is arranged below the turntable.

In the spindle motor of the type stated above, the height of the spindle motor is limited in light of the specifications of the disk drive apparatus. Thus, when fixing the turntable to the shaft, it may be impossible to sufficiently secure the axial length along which the turntable and the shaft make contact with each other. This may lead to a shortage in the fastening strength. Accordingly, there is a need to bond and fix the turntable to at least the upper surface of the rotor holder.

In the meantime, the spindle motor is provided with an annular space for accommodating balancing steel balls. The space is defined by closing an upwardly depressed annular recess with an annular plate at the lower side of the recess. The annular plate is readily fixed in place by interposing the same between the body of the turntable and the rotor holder. Due to this structure, the turntable and the rotor holder are fixed together by an adhesive agent at the radial inner side of the annular recess.

When adhesively fixing the turntable and the rotor holder, a clearance of suitable size needs to be left between the turntable and the rotor holder. The bonding strength is changed depending on the size of the clearance. However, the size of the clearance varies with the thickness of the annular plate or the forming accuracy of the body of the turntable. In case where an attempt is made to reduce variations in the clearance size by increasing the form accuracy of parts, it becomes difficult to reduce the manufacturing cost.

SUMMARY OF THE INVENTION

In accordance with a first aspect of the invention, there is provided a spindle motor for removably holding a disk having a central opening, including: a shaft arranged in a coaxial relationship with a center axis extending in an up-down direction; a cone capable of making sliding movement in the up-down direction with respect to an upper portion of the shaft; a turntable directly or indirectly fixed to the shaft at a lower side of the cone; a cylindrical closed-top rotor holder directly or indirectly fixed to the shaft at a lower side of the turntable; a rotor magnet fixed to an inner circumferential surface of a cylinder portion of the rotor holder; a stator arranged inside the rotor magnet; and a bearing mechanism arranged to rotatably support the shaft so that the shaft can rotate about the center axis, the cone including a disk holding surface inclined radially outward and downward, the turntable further including: a resin-made table body having a disk support portion arranged around the cone and an annular groove portion depressed upward at a lower side of the disk support portion; a plurality of balls rotatably arranged within the annular groove portion; an annular closure portion arranged between the table body and the rotor holder to close a lower opening of the annular groove portion; and a disc-shaped portion arranged radially inward of the annular groove portion of the table body, the disc-shaped portion having an upper surface bonded to the table body by an adhesive agent and a lower surface bonded to the rotor holder by the adhesive agent.

With such configuration, it is possible to reduce variations in the bonding strength of the body of the turntable and the rotor holder.

Other features, elements, steps, characteristics and advantages of the present invention will become more apparent from the following detailed description of the preferred embodiments of the present invention with reference to the attached drawings.

DETAILED DESCRIPTION OF THE PREFERRED EMBODIMENTS

Embodiments of the present invention will now be described with reference to the accompanying drawings which form a part hereof. In the subject specification, the upper side in the direction of a center axis of a spindle motor will be just referred to as "upper" and the lower side as "lower". However, these definitions are not intended to indicate the positional relationship and orientation of the spindle motor and the disk drive apparatus when they are installed within actual devices. The direction parallel to the center axis will be referred to as "axial", the direction extending radially from the center axis as "radial" and the direction extending circumferentially about the center axis as "circumferential".

Figure 1:
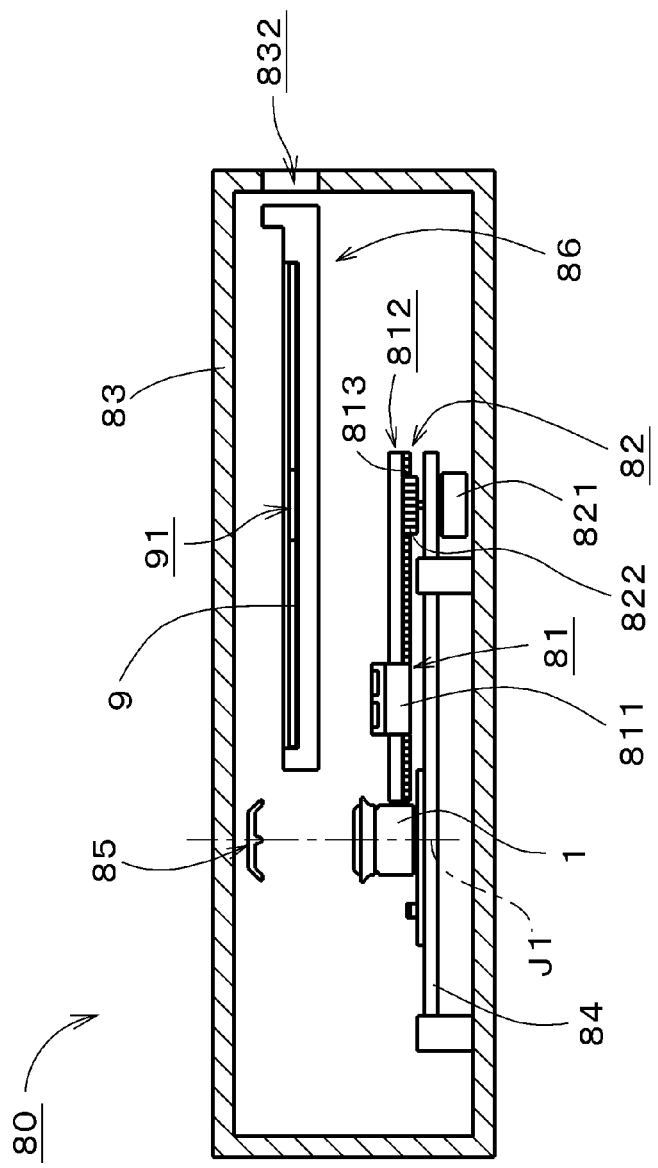
FIG. 1 is a section view showing a disk drive apparatus.

FIG. 1 is a section view showing a disk drive apparatus 80 provided with a spindle motor 1 according to the present invention. The disk drive apparatus 80 preferably includes a spindle motor 1, an optical pickup mechanism 81, a moving mechanism 82 and a housing 83. The housing 83 accommodates therein the spindle motor 1, the optical pickup mechanism 81 and the moving mechanism 82.

The spindle motor 1, when inserted into a central opening 91 of a disk 9, brings the center of the disk 9 into alignment with the rotation axis and rotates the disk 9. The optical pickup mechanism 81 records and reproduces information with respect to the disk 9 by irradiating laser light toward the disk 9. The moving mechanism 82 moves the optical pickup mechanism 81 in the radial direction of the disk 9.

The spindle motor 1 and the optical pickup mechanism 81 are held in place by a chassis 84. If the chassis 84 is moved upward in a state that the center of the central opening 91 of the disk 9 is aligned with the center axis J1 of the spindle motor 1, the central opening 91 of the disk 9 is mounted to a chucking device of the spindle motor 1. At this time, the disk 9 is clamped from above by a clamper 85.

The moving mechanism 82 preferably includes a motor 821 and a transmission gear 822 which is attached to the output shaft of the motor 821. The transmission gear 822 transmits rotation of the motor 821 to the optical pickup mechanism 81.

The housing 83 has an insertion opening 832 through which the disk 9 is loaded into and unloaded from the housing 83. A tray 86 is arranged within the housing 83. The tray 86 can be moved to the outside of the housing 83. The disk 9 is placed on the tray 86 that conveys the disk 9 to the spindle motor 1.

The optical pickup mechanism 81 preferably includes a recording and reproducing unit 811 and a moving unit 812. The recording and reproducing unit 811 is arranged to irradiate laser light. The moving unit 812 is arranged to move the recording and reproducing unit 811 in the radial direction. The moving unit 812 has a rack gear 813 meshing with the transmission gear 822. If the motor 821 rotates, the moving unit 812 moves in the radial direction. In response, the recording and reproducing unit 811 is moved in the radial direction.

Figure 2:
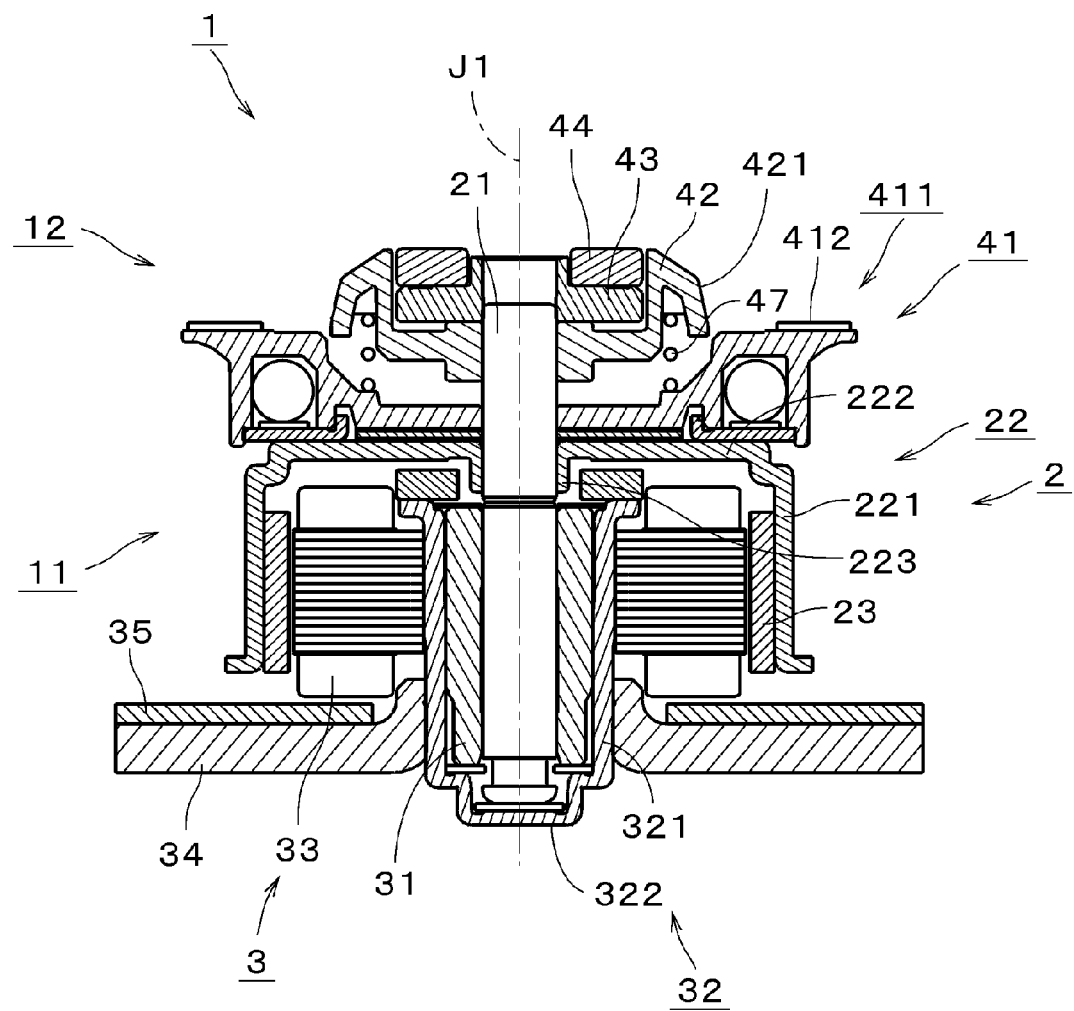
FIG. 2 is a section view showing a spindle motor.

FIG. 2 is a vertical section view of the spindle motor 1. The spindle motor 1 preferably includes a motor unit 11 and a chucking device 12. The motor unit 11 preferably includes a rotary unit 2 and a stationary unit 3. The rotary unit 2 rotates about the center axis J1. The stationary unit 3 rotatably supports the rotary unit 2. The chucking device 12 is arranged axially above the rotary unit 2.

The rotary unit 2 preferably includes a substantially cylindrical columnar shaft 21, a substantially cylindrical closed-top rotor holder 22 and a substantially annular rotor magnet 23. The shaft 21 is arranged in a coaxial relationship with the center axis J1 extending in the up-down direction. The rotor holder 22 is fixed to the shaft 21 to rotate about the center axis J1.

The rotor holder 22 preferably includes an outer cylinder portion 221, a cover portion 222 and an inner cylinder portion 223. The outer circumferential surface of the rotor magnet 23 is fixed to the inner circumferential surface of the outer cylinder portion 221. The cover portion 222 is a planar portion extending from the upper portion of the outer cylinder portion 221 toward the center axis J1. The cover portion 222 is arranged below the turntable 41 of the chucking device 12 to be described later. The inner cylinder portion 223 extends axially downward from the inner edge of the cover portion 222. The inner circumferential surface of the inner cylinder portion 223 is fixed to the outer circumferential surface of the shaft 21. It is not always necessary that the rotor holder 22 be directly fixed to the shaft 21. For example, the rotor holder 22 may be indirectly fixed to the shaft 21 through a member fixed to the shaft 21.

The stationary unit 3 preferably includes a substantially cylindrical sleeve 31, a housing 32, a stator 33, a substantially flat attachment plate 34 and a circuit board 35. The inner circumferential surface of the sleeve 31 as a bearing mechanism supports the shaft 21 so that the shaft 21 can rotate about the center axis J1. The sleeve 31 is made of a sintered material. The housing 32 preferably includes a cylinder portion 321 and a bottom portion 322. The inner circumferential surface of the cylinder portion 321 holds the outer circumferential surface of the sleeve 31 in place. The bottom portion 322 closes the lower end of the cylinder portion 321. The inner circumferential surface of the stator 33 is fixed to the outer circumferential surface of the cylinder portion 321 of the housing 32. The stator 33 is arranged inside the rotor magnet 23. The outer circumferential surface of the stator 33 is radially opposed to the inner circumferential surface of the rotor magnet 23. The attachment plate 34 is arranged axially below the stator 33. The inner circumferential surface of the attachment plate 34 is fixed to the outer circumferential surface of the cylinder portion 321 of the housing 32. The circuit board 35 is arranged on the upper surface of the attachment plate 34.

As an electric current is supplied from an external power source (not shown) to the stator 33, the stator 33 generates magnetic fields facing the rotor magnet 23. Due to the magnetic interaction between the magnetic fields and the rotor magnet 23, the rotary unit 2 is given a rotary drive force acting about the center axis J1.

The chucking device 12 preferably includes a turntable 41, a cone 42, a yoke 43, a clamp magnet 44 and a coil spring 47, all of which have a substantially annular shape. The turntable 41 is fixed to the upper surface of the cover portion 222 of the rotor holder 22 by an adhesive agent. The turntable 41 may be fixed to the shaft 21.

The cone 42 is arranged axially above the turntable 41 and has a disk holding surface 421 making contact with the central opening 91 of the disk 9. The disk holding surface 421 is arranged in the outer periphery of the cone 42 and is inclined radially outward and downward. The cone 42 is formed by injection-molding a resin material. The cone 42 has a through-hole extending in the up-down direction along the center axis J1. The upper portion of the shaft 21 is inserted into the through-hole. The cone 42 can make sliding movement in the up-down direction with respect to the upper portion of the shaft 21.

The yoke 43 is arranged axially above the cone 42 and is fixed to the shaft 21. The yoke 43 is formed of a magnetic material. The clamp magnet 44 is fixed to the upper surface of the yoke 43 by a magnetic attraction force acting between the clamp magnet 44 and the yoke 43 and an adhesive agent. Thus the clamp magnet 44 is indirectly fixed to the shaft 21 through the yoke 43. The coil spring 47 is arranged around the shaft 21 and is interposed between the turntable 41 and the cone 42 to extend in the up-down direction. In the spindle motor 1, the shaft 21 may be regarded as one component of the chucking device 12 for holding the turntable 41 and the like.

The turntable 41 is arranged below the cone 42. The turntable 41 is bonded to the rotor holder 22 as will be described later and is therefore indirectly fixed to the shaft 21. The turntable 41 has a disk support portion 411 arranged radially outward of the cone 42. The disk 9 is removably mounted on the disk support portion 411. The disk support portion 411 is provided with an annular rubber member 412 making contact with the lower surface of the disk 9 as mounted. The annular rubber member 412 is arranged on the upper surface of the disk support portion 411.

Figure 3:
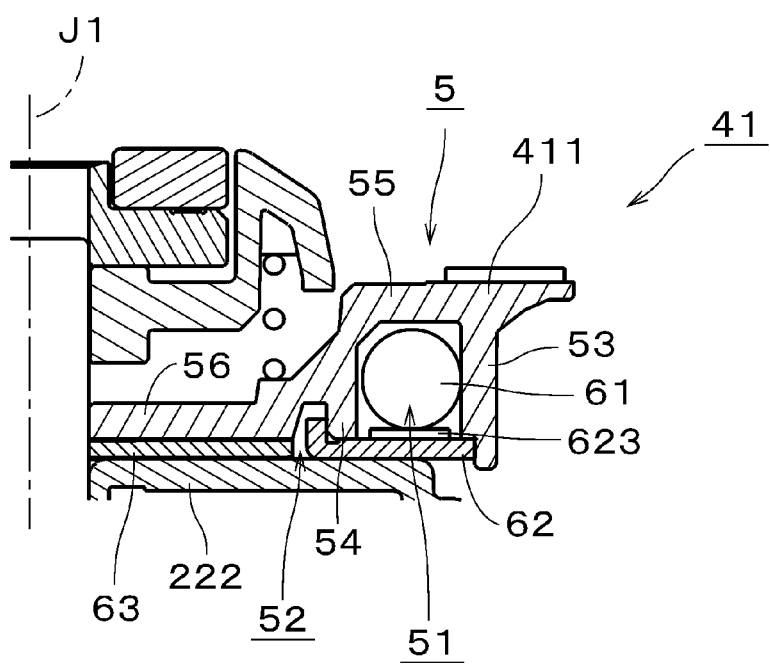
FIG. 3 is a section view showing a turntable and its surroundings on an enlarged scale.

FIG. 3 is a section view showing the turntable 41 and its surroundings on an enlarged scale. The turntable 41 preferably includes a table body 5, a plurality of balls 61, an annular plate 62 and a disc-shaped portion 63. The table body 5 is made of a resin. The table body 5 preferably includes the afore-mentioned disk support portion 411 (excluding the rubber member 412) and an annular groove portion 51. The annular groove portion 51 is formed into a substantially annular shape about the center axis J1 and is depressed upward at the lower side of the disk support portion 411. It is not always necessary that the annular groove portion 51 be arranged just below the disk support portion 411. The annular groove portion 51 overlaps with the outer edge of the cover portion 222 of the rotor holder 22 in the up-down direction.

The table body 5 preferably further includes an adhesive-agent-holding groove portion 52 depressed upward at the radial inner side of the annular groove portion 51. The adhesive-agent-holding groove portion 52 is formed into a substantially annular shape about the center axis J1. The adhesive-agent-holding groove portion 52 may not have a perfectly annular shape as long as it is arranged to surround the center axis J1. A cylindrical wall 53 extending downward from the disk support portion 411 is arranged radially outward of the annular groove portion 51. A cylindrical wall 54 extending downward is arranged between the annular groove portion 51 and the adhesive-agent-holding groove portion 52. Hereinafter, the cylindrical wall 53 will be referred to as "outer cylindrical wall 53" and the cylindrical wall 54 as "inner cylindrical wall 54".

The annular groove portion 51 has a bottom portion 55 that interconnects the inner cylindrical wall 54 and the outer cylindrical wall 53 of the table body 5. The bottom portion 55 of the annular groove portion 51 extends radially inward from the disk support portion 411. The bottom portion 55, which is positioned in the upper portion of the table body 5, will be referred to as "annular cover portion 55" herein below. The radial inner region of the annular cover portion 55 is depressed downward to thereby form a bottom portion 56 positioned radially inward of the adhesive-agent-holding groove portion 52. The bottom portion 56 has a substantially flat shape. Hereinafter, the bottom portion 56 will be referred to as "central bottom portion 56".

The balls 61 are rotatably arranged within the annular groove portion 51. In other words, the balls 61 are rotatably arranged within a space surrounded by the portions defining the annular groove portion 51 and the annular plate 62. The balls 61 are made of iron but may be formed of a material other than iron. An annular cushion member 623 is attached to the upper surface of the annular plate 62. This makes it possible to reduce noises generated by the movement of the balls 61 and to dampen the movement of balls 61.

Figure 4:
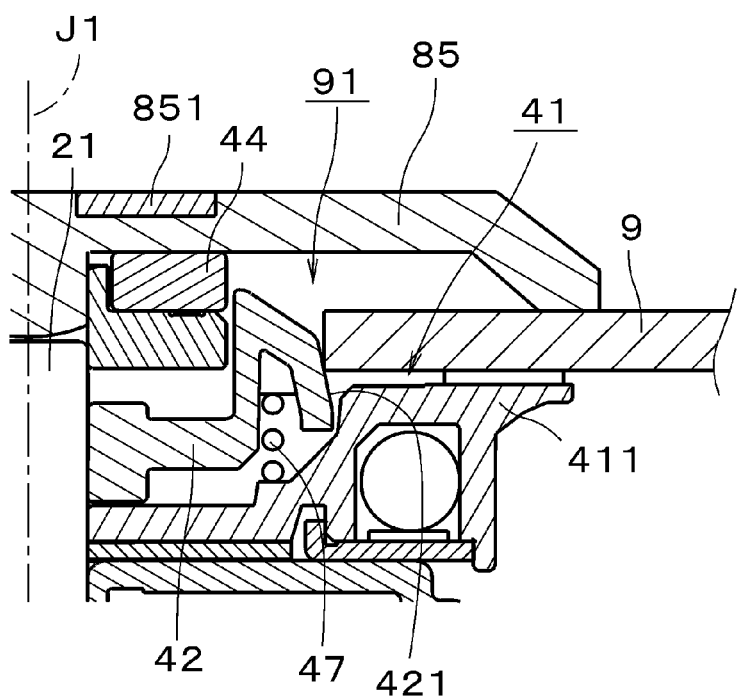
FIG. 4 is a view illustrating a state in which a disk is mounted on the turntable.

FIG. 4 is a view illustrating a state in which the disk 9 is mounted on the turntable 41. If the disk 9 is positioned above the turntable 41 prior to being mounted on the turntable 41, the spindle motor 1 is moved upward. A magnetic body 851 is provided in the clamper 85. A magnetic attraction force acts between the clamp magnet 44 and the magnetic body 851, whereby the disk 9 is clamped on the disk support portion 411.

At this time, the edge of the central opening 91 of the disk 9 comes into contact with the disk holding surface 421 of the cone 42, causing the cone 42 to move downward along the shaft 21. Since the cone 42 is biased upward by the coil spring 47, the center of the disk 9 is exactly aligned with the center axis J1.

Figure 5:
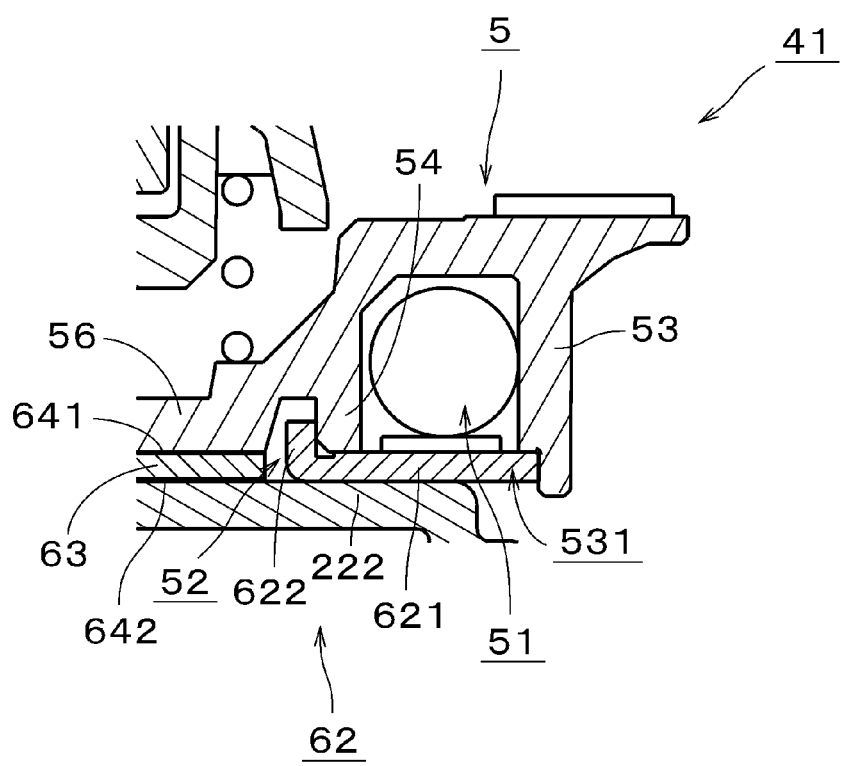
FIG. 5 is a section view showing an annular plate and its surroundings on an enlarged scale.

FIG. 5 is a section view showing the annular plate 62 and its surroundings on a further enlarged scale. The annular plate 62 is arranged between the table body 5 and the cover portion 222 of the rotor holder 22. The annular plate 62 preferably includes a flat portion 621 and a cylinder portion 622. The flat portion 621 is an annular closure portion for closing the opening of the annular groove portion 51. The cylinder portion 622 extends upward from the radial inner end of the flat portion 621. The outer cylindrical wall 53 has a step portion 531 formed on the radial inner surface of the lower portion thereof. The downwardly-facing surface of the step portion 531 makes contact with the upper surface of the radial outer end portion of the flat portion 621. The lower end of the inner cylindrical wall 54 makes contact with the upper surface of the radial inner end portion of the flat portion 621. The cylinder portion 622 is positioned within the adhesive-agent-holding groove portion 52. The outer circumferential surface of the cylinder portion 622 makes contact with or adjoins to the inner circumferential surface of the inner cylindrical wall 54. The lower surface of the flat portion 621 makes contact with the upper surface of the cover portion 222 of the rotor holder 22.

The disc-shaped portion 63 is arranged between the central bottom portion 56 and the cover portion 222. The disc-shaped portion 63 is positioned radially inward of the annular groove portion 51. The upper surface of the disc-shaped portion 63 is bonded to the lower surface of the central bottom portion 56 by an adhesive agent. The lower surface of the disc-shaped portion 63 is bonded to the upper surface of the cover portion 222 by an adhesive agent. In the following description, an adhesive agent layer on the upper surface of the disc-shaped portion 63 is designated by reference symbol 641 and an adhesive agent layer beneath the lower surface of the disc-shaped portion 63 is designated by reference symbol 642. Each of the adhesive agent layers 641 and 642 have a thickness of, e.g., from about 0.05 mm to about 0.1 mm. Although not shown in the drawings, the excess adhesive agent remaining in a bonding process is held within the adhesive-agent-holding groove portion 52. Thus the adhesive agent is prevented from infiltrating into the annular groove portion 51. The axial upper end of the cylinder portion 622 is positioned axially higher than the adhesive agent layers 641 and 642. In other words, the axial upper end of the cylinder portion 622 is positioned axially higher than the lower surface of the central bottom portion 56. This makes it possible to more effectively prevent the adhesive agent from infiltrating into the annular groove portion 51. Fine grooves may be formed on the lower surface of the central bottom portion 56 in order to increase the bonding strength.

As shown in FIGS. 3 and 4, the shaft 21 makes contact with the inner circumferential surface of the disc-shaped portion 63. This makes it possible to improve the coaxiality of the disc-shaped portion 63 with respect to the shaft 21.

The clearance between the shaft 21 and the disc-shaped portion 63 may be smaller than the clearance between the disc-shaped portion 63 and the flat portion 621 of the annular plate 62. In this case, the disc-shaped portion 63 and the annular plate 62 can be arranged with no mutual contact even if disc-shaped portion 63 is off-centered with respect to the shaft 21 when arranging the disc-shaped portion 63 on the upper surface of the cover portion 222.

For the sake of convenience in description, the disc-shaped portion 63 is described as if it forms a part of the turntable 41. In fact, however, the turntable 41 is bonded to the rotor holder 22 by an adhesive agent with the disc-shaped portion 63 interposed therebetween.

With the structure set forth above, the table body 5 is bonded to the rotor holder 22 through the two adhesive agent layers 641 and 42. For that reason, even if a relatively large error is generated in the shape of the table body 5 or in the thickness of the annular plate 62, the thickness of each of the adhesive agent layers 641 and 642 is changed only by one half of the error. As a result, it is possible to reduce variations in the bonding strength as compared with a case where the table body 5 is directly bonded to the cover portion 222 by an adhesive agent.

The flat portion 621 is thicker than the disc-shaped portion 63. The regions of the lower surface of the table body 5 facing the flat portion 621 and the disc-shaped portion 63 at the radial inner side of the annular groove portion 51 (except the adhesive-agent-holding groove portion 52) are coplanar regions perpendicular to the center axis J1. In other words, the downwardly-facing surface of the step portion 531, the lower end surface of the inner cylindrical wall 54 and the lower surface of the central bottom portion 56 are positioned on the same plane perpendicular to the center axis J1. As a consequence, the total size of the upper and lower clearances of the disc-shaped portion 63 can be easily set to fall within a specified range by bringing the upper surface of the flat portion 621 into contact with the step portion 531 and the inner cylindrical wall 54 and bringing the lower surface of the flat portion 621 into contact with the cover portion 222.

If the table body 5 is pressed toward the rotor holder 22 with an adhesive agent interposed therebetween, the thickness of the adhesive agent layer 641 and the thickness of the adhesive agent layer 642 become substantially equal to each other. With the structure stated above, it is therefore possible to stably obtain an increased bonding strength by just strongly pressing the table body 5 toward the cover portion 222. Since a large number of regions of the lower surface of the table body 5 are positioned on the same plane, it becomes easy to manufacture the molds for molding the table body 5 and to manage the shape of the table body 5.

In order to further reduce variations in the bonding strength, a plurality of disc-shaped portions 63 differing in thickness from each other may be prepared and one of the disc-shaped portions 63 having a desired thickness may be selected depending on the shape of the table body 5 or the thickness error of the annular plate 62.

The contact positions are not limited to the ones shown in FIG. 5 as long as the upper surface of the flat portion 621 makes contact with the table body 5 and the lower surface of the flat portion 621 makes contact with the rotor holder 22. As far as it is possible to control the pressing force in the bonding process, the thickness of the disc-shaped portion 63 may be equal to or greater than the thickness of the flat portion 621. The region of the lower surface of the table body 5 making contact with the upper surface of the flat portion 621 and the region of the lower surface of the table body 5 facing the upper surface of the disc-shaped portion 63 may be positioned at different heights. Even if the flat portion 621 does not make contact with the lower surface of the table body 5 or the upper surface of the cover portion 222, the thickness of the adhesive agent layers 641 and 642 can be appropriately set by controlling the pressing force applied to the table body 5.

Figure 6:
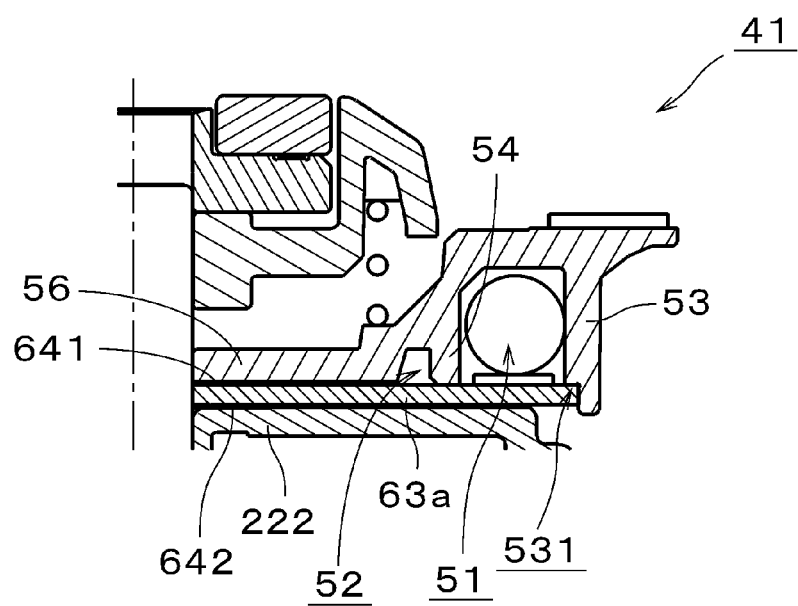
FIG. 6 is a section view illustrating another example of the turntable.

FIG. 6 is a view showing another example of the turntable 41. In the turntable 41 shown in FIG. 6, a single disc-shaped portion 63a is provided in place of the annular plate 62 and the disc-shaped portion 63 shown in FIG. 5. Other structures remain substantially the same as those shown in FIG. 5. Hereinafter, the disc-shaped portion 63a is called "enlarged disc-shaped portion 63a". The radial outer portion of the enlarged disc-shaped portion 63a serves as an annular closure portion just like the flat portion 621 shown in FIG. 5. The radial inner portion of the enlarged disc-shaped portion 63a has the same function as the disc-shaped portion 63 shown in FIG. 5.

The upper surface of the enlarged disc-shaped portion 63a makes contact with the downwardly-facing surface of the step portion 531 of the outer cylindrical wall 53 and the lower end surface of the inner cylindrical wall 54. At the radial inner side of the adhesive-agent-holding groove portion 52, the upper surface of the enlarged disc-shaped portion 63a is bonded to the lower surface of the central bottom portion 56 by an adhesive agent, as a result of which the adhesive agent layer 641 is formed. The lower surface of the enlarged disc-shaped portion 63a is bonded to the substantially entire region of the cover portion 222 of the rotor holder 22 by an adhesive agent. In other words, the adhesive agent layer 642 is broadened to below the annular groove portion 51. This makes it possible to increase the bonding strength.

The downwardly-facing surface of the step portion 531 and the lower end surface of the inner cylindrical wall 54 are positioned at the same height in the axial direction. The lower surface of the central bottom portion 56 is positioned a little higher than the downwardly-facing surface of the step portion 531 and the lower end surface of the inner cylindrical wall 54. In other words, the region of the lower surface of the table body 5 existing between the annular groove portion 51 and the adhesive-agent-holding groove portion 52 is positioned lower than the region of the lower surface of the table body 5 existing at the radial inner side of the adhesive-agent-holding groove portion 52. As a consequence, in the wide region between the central bottom portion 56 and the enlarged disc-shaped portion 63a, the distance therebetween can be set into a specified dimension with ease and the thickness of the adhesive agent layer 641 can be set into an appropriate dimension with ease. It is also possible to easily secure a broad space for holding the adhesive agent. The thickness of the adhesive agent layer 642 can be managed by controlling the pressing force applied to the table body 5 in the bonding process.

In the turntable 41 illustrated in FIG. 6, the flat portion 621 of the annular plate 62 serving as an annular closure portion and the disc-shaped portion 63 shown in FIG. 5 are formed into a single member, which makes it possible to simplify the structure of the turntable 41. As is the case in FIG. 3, the adhesive-agent-holding groove portion 52 prevents the adhesive agent from infiltrating into the annular groove portion 51. Fine grooves for increasing the bonding strength may be provided on the lower surface of the central bottom portion 56.

As illustrated in FIG. 6, the shaft 21 makes contact with the inner circumferential surface of the disc-shaped portion 63a. This makes it possible to improve the coaxiality of the disc-shaped portion 63a with respect to the shaft 21.

Figure 7:
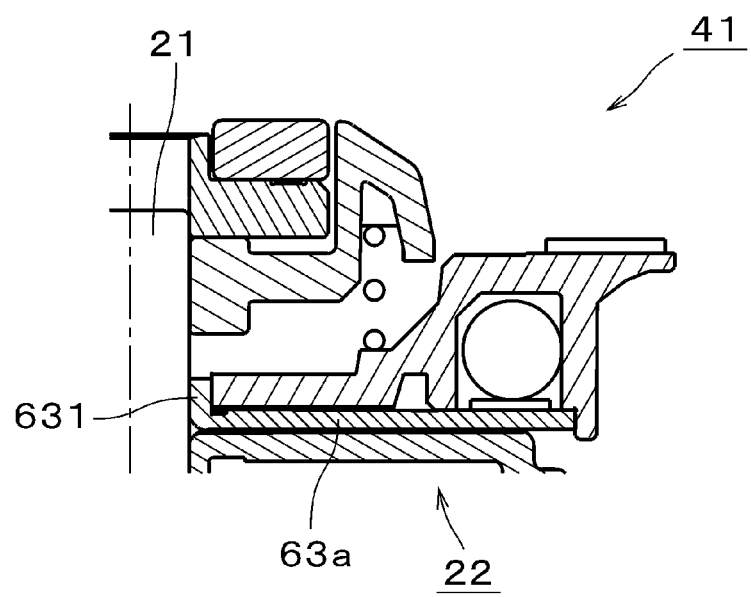
FIG. 7 is a section view illustrating a further example of the turntable.

FIG. 7 is a view showing a further example of the turntable 41. In the turntable 41 shown in FIG. 7, a cylinder portion 631 is added to the enlarged disc-shaped portion 63a shown in FIG. 6. The enlarged disc-shaped portion 63a is made of metal. The cylinder portion 631 extends upward from the inner peripheral edge of the enlarged disc-shaped portion 63a. Other structures remain the same as those shown in FIG. 6.

In the turntable 41 shown in FIG. 7, the cylinder portion 631 is press-fitted to the shaft 21. Thus the enlarged disc-shaped portion 63a is strongly fixed in place due to the bonding to the rotor holder 22 and the press-fitting to the shaft 21. As a result, the turntable 41 is more strongly fixed to the rotary unit 2. A portion like the cylinder portion 631 may be provided in the disc-shaped portion 63 shown in FIG. 3. The cylinder portion 631 may extend downward.

While one embodiment of the present invention has been described above, the present invention is not limited thereto but may be modified in many different forms.

In the chucking device 12, other elastic members than the coil spring 47, e.g., a resin member, may be used as the pressing member for pressing the cone 42 upward. The cone 42 needs not always to be pressed upward as long as it can be moved downward by the force applied from the disk 9. For example, the cone 42 may be attracted toward the clamper 85.

The cone 42 may be capable of making indirect sliding movement with respect to the upper portion of the shaft 21. For example, one or more members may be fixed to the surface of the cone 42 defining the through-hole so that the members can be slid with respect to the upper portion of the shaft 21. In this case, the cone 42 can make indirect sliding movement with respect to the upper portion of the shaft 21.

It is not always necessary that all the turntable 41, the cone 42, the yoke 43, the clamp magnet 44 and the coil spring 47 have a substantially annular shape. For instance, the clamp magnet 44 may have a substantially arc-like shape. A plurality of clamp magnets may be arranged about the center axis J1 at a regular interval in the circumferential direction.

It is not always necessary that the turntable 41 be bonded to the rotor holder 22 and be indirectly fixed to the shaft 21. The turntable 41 may be directly fixed to the shaft 21.

The disc-shaped portion 63 and the enlarged disc-shaped portion 63*a* may be made of other materials than metal, e.g., resin. The shape of the disc-shaped portion 63 and the enlarged disc-shaped portion 63*a* is not limited to the flat shape but may be a film-like shape. In this case, the bonding strength in the structure shown in FIG. 3 may be increased by forming the table body 5 and then arranging the disc-shaped portion 63 only if the distance between the lower surface of the central bottom portion 56 and the upper surface of the cover portion 222 is large.

The disc-shaped portion 63 and the portion of the enlarged disc-shaped portion 63*a* corresponding to the disc-shaped portion 63 need not always be a perfect disc-like shape but may be a substantially disc-like shape. For example, the disc-shaped portion 63 and the portion of the enlarged disc-shaped portion 63*a* corresponding to the disc-shaped portion 63 may be formed into a substantially C-like shape having one radially-extending slit. The disc-shaped portion 63 may be formed by allowing two substantially semicircular members to face each other with the shaft 21 interposed therebetween. In this manner, the disc-shaped portion 63 may be modified in many different forms as long as it exists around the shaft 21 in a disc-like shape.

In the spindle motor 1, other bearings than the sleeve 31, e.g., ball bearings, may be used as the bearing mechanism for rotatably supporting the shaft 21. The optical pickup mechanism 81 of the disk drive apparatus 80 needs only to have a recording and reproducing unit capable of performing at least one of an optical recording task and an optical reproducing task with respect to the disk 9.

The configurations of the foregoing embodiment and modified examples may be appropriately combined unless contradictory to one another.

The present invention can find its application in spindle motors for disk drive apparatuses that rotate disks of different specifications on which information was recorded or is to be recorded.

While one preferred embodiment of the present invention has been described above, this embodiment is presented merely for the sake of illustration. The scope of the present invention should not be construed in a limitative meaning. The scope of the present invention is defined by the claims. All modifications and changes equivalent to the subject matters of the claims fall within the scope of the present invention.

What is claimed is:

1. A spindle motor for removably holding a disk having a central opening, comprising:
    a shaft arranged in a coaxial relationship with a center axis extending in an up-down direction;
    a cone capable of making sliding movement in the up-down direction with respect to an upper portion of the shaft;
    a turntable directly or indirectly fixed to the shaft at a lower side of the cone;
    a cylindrical closed-top rotor holder directly or indirectly fixed to the shaft at a lower side of the turntable;
    a rotor magnet fixed to an inner circumferential surface of a cylinder portion of the rotor holder;
    a stator arranged inwardly of the rotor magnet; and
    a bearing mechanism arranged to rotatably support the shaft so that the shaft can rotate about the center axis,
    wherein the cone includes a disk holding surface inclined radially outward and downward, and
    the turntable further includes: a resin-made table body having a disk support portion arranged around the cone and an annular groove portion depressed upward at a lower side of the disk support portion; a plurality of balls rotatably arranged within the annular groove portion; an annular closure portion arranged between the table body and the rotor holder to close an opening of the annular groove portion; and a disc-shaped portion arranged radially inward of the annular groove portion of the table body, the disc-shaped portion having an upper surface bonded to the table body by a first adhesive agent and a lower surface bonded to the rotor holder by a second adhesive agent.

2. The spindle motor of claim 1, wherein the annular closure portion has an upper surface making contact with the table body and a lower surface making contact with the rotor holder.

3. The spindle motor of claim 2, wherein the annular closure portion is thicker than the disc-shaped portion and the table body has a lower surface provided with regions facing the annular closure portion and the disc-shaped portion at a radial inner side of the annular groove portion, the regions being coplanar regions perpendicular to the center axis.

4. The spindle motor of claim 1, wherein the disc-shaped portion has an inner circumferential surface making contact with the shaft.

5. The spindle motor of claim 1, wherein a clearance between the shaft and the disc-shaped portion is smaller than a clearance between the disc-shaped portion and the annular closure portion.

6. The spindle motor of claim 1, wherein the table body further includes an upwardly-depressed adhesive-agent-holding groove portion arranged radially inward of the annular groove portion.

7. The spindle motor of claim 6, wherein the annular closure portion has a cylinder portion extending upward from a radial inner end portion thereof, the cylinder portion being arranged within the adhesive-agent-holding groove portion, the cylinder portion having an axial upper end positioned axially higher than a lower surface of the table body existing radially inward of the annular groove portion.

8. The spindle motor of claim 1, wherein the annular closure portion and the disc-shaped portion are formed into a single member.

9. The spindle motor of claim 8, wherein the table body further includes an upwardly-depressed adhesive-agent-holding groove portion arranged radially inward of the annular groove portion.

10. The spindle motor of claim 9, wherein the table body has a lower surface provided with a region existing between the annular groove portion and the adhesive-agent-holding groove portion, the region being positioned lower than a region of the lower surface of the table body existing radially inward of the adhesive-agent-holding groove portion.

11. The spindle motor of claim 1, wherein the disc-shaped portion is made of metal and is provided with a cylinder portion press-fitted to the shaft.

12. The spindle motor of claim 1, wherein the table body has a lower surface provided with a region existing radially inward of the annular groove portion, the region having fine grooves.

13. The spindle motor of claim 1, wherein the annular closure portion has an upper surface and an annular cushion member attached to the upper surface.

14. A disk drive apparatus, comprising:
   the spindle motor of claim 1;
   an optical pickup mechanism including a recording and reproducing unit arranged to perform at least one of an optical recording task and an optical reproducing task with respect to the disk; and
   a moving mechanism arranged to move the optical pickup mechanism in a radial direction.

* * * * *